US005170345A

United States Patent [19]

Poole

[11] Patent Number: 5,170,345

[45] Date of Patent: Dec. 8, 1992

[54] CONTROL CIRCUIT FOR COIN OPERATED AMUSEMENT GAMES

[75] Inventor: David L. Poole, Libertyville, Ill.

[73] Assignee: Midway Manufacturing Corporation, Chicago, Ill.

[21] Appl. No.: 752,970

[22] Filed: Aug. 29, 1991

Related U.S. Application Data

[63] Continuation of Ser. No. 609,116, Oct. 31, 1990, abandoned, which is a continuation of Ser. No. 337,324, Apr. 13, 1989, abandoned.

[51] Int. Cl.[5] ........................ A63F 7/00; G06F 15/44

[52] U.S. Cl. ................................ 364/410; 273/121 A

[58] Field of Search ................... 364/410, 411, 413.02, 364/412; 273/1 E, 118 A, 121 A; 340/323 R, 309.6

[56] References Cited

U.S. PATENT DOCUMENTS

| | | | |
|---|---|---|---|
| 4,093,232 | 6/1978 | Nutting | 273/121 |
| 4,174,517 | 11/1979 | Mandel | 340/310 |
| 4,198,051 | 4/1980 | Bracha | 273/121 |
| 4,264,960 | 4/1981 | Gurr | 364/492 |
| 4,334,679 | 6/1982 | Doyle et al. | 273/85 G |
| 4,367,876 | 1/1983 | Kotoyori | 273/121 A |
| 4,380,335 | 4/1983 | Chaudhry et al. | 273/121 A |
| 4,394,018 | 7/1983 | Orbanes et al. | 364/410 |
| 4,396,193 | 8/1983 | Reinhardt et al. | 364/410 |
| 4,408,762 | 10/1983 | Brey | 273/121 A |
| 4,467,412 | 8/1984 | Hoff | 364/410 |
| 4,517,654 | 5/1985 | Carmean | 273/85 G |
| 4,567,557 | 1/1986 | Burns | 364/145 |
| 4,620,283 | 10/1986 | Butt | 364/493 |
| 4,692,863 | 9/1987 | Moosz | 364/410 |
| 4,705,964 | 11/1987 | Higgs | 307/278 |

OTHER PUBLICATIONS

Kawakami, D. et al., *Signetics Logic-TTL Data Manual*, pp. 353-356, 1978.

Holt, C. *Electronic Circuits*, 1978, pp. 168-172.

Logic Design Principles Edward J. McCluskey, 1986 p. 305.

*Primary Examiner*—Gail O. Hayes
*Assistant Examiner*—Khai Tran
*Attorney, Agent, or Firm*—Rockey, Rifkin and Ryther

[57] ABSTRACT

The cost and complexity of connecting electrically actuated devices to a game control microprocessor in a coin operated amusement game can be reduced by utilizing a standard control assembly including a memory element for each of the devices and where a control circuit is used to connect the assemblies in series with the microprocessor. Data and clock lines in the control circuit are used to transmit control signals to the devices and the control circuit can additionally include power supply lines and a ground line. A similar arrangement can be used to transport data representing the status of game operated switches to the microprocessor.

7 Claims, 4 Drawing Sheets

FIG. 1
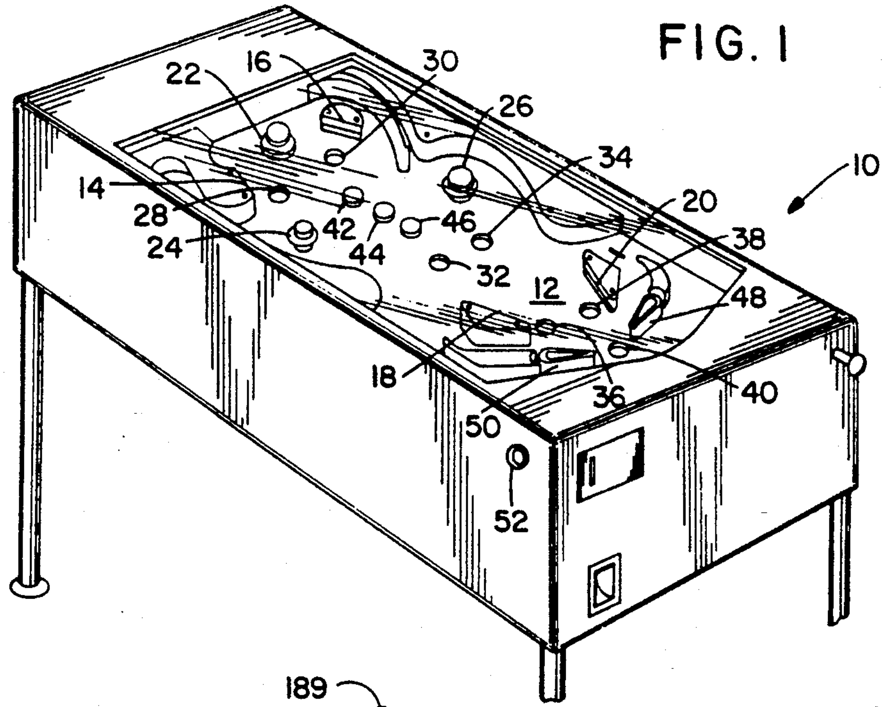
FIG. 7
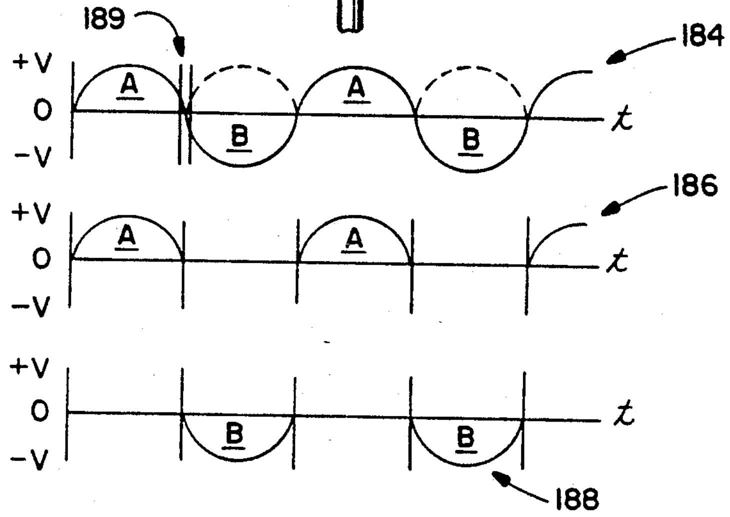
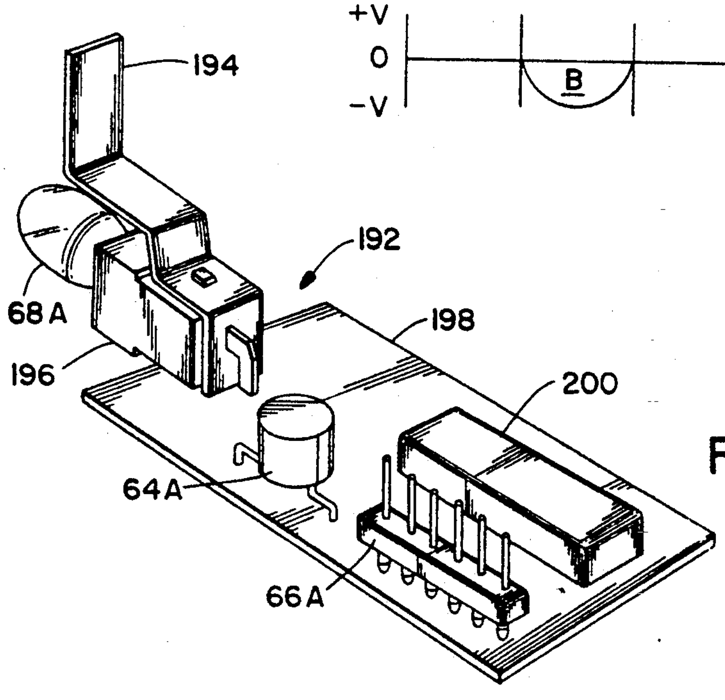
FIG. 8

PROCESSOR
CLOCK
54
DATA
CLOCK
168
170
PHASE A
PHASE B
172
174
185
DC POWER SUPPLY
56
AC SOURCE
191
ZERO CROSSING DETECTOR
190
DEVICE 1
164A
DEVICE 2
164B
DEVICE n/2
164C
DEVICE n/2+1
166A
DEVICE n/2+2
166B
DEVICE n
166C

PROCESSOR
CLOCK
54
DATA
DATA
LOAD
CLOCK
180
148
150
182
DEVICE 1
176A
DEVICE 2
176B
DEVICE n
176C
SWITCH 1
178A
SWITCH 2
178B
SWITCH n
178C

CONTROL CIRCUIT FOR COIN OPERATED AMUSEMENT GAMES

This is a continuation of Ser. No. 07/609,116 filed Oct. 31, 1990, now abandoned, which in turn is a continuation of copending application Ser. No. 07/337,324 filed on Apr. 13, 1989, also now abandoned.

TECHNICAL FIELD

The invention relates to microprocessor controlled coin operated amusement games and in particular to circuits for controlling various electrically actuated devices such as lamps and solenoids and for determining the status of switches in coin operated amusement games.

BACKGROUND OF THE INVENTION

Most coin operated amusement or arcade-type games of the ball rolling type such as pinball machines, include a number of electrically actuated devices such as solenoid actuated kickers and thumper bumpers as well as a large number of lights. In the more modern machines these devices are typically under the control of a microprocessor. In addition, coin operated games of this, type usually include a large number of ball activated switches which provide information to the microprocessor as to the location of the ball for scoring purposes as well as the activation of various lights and other electrically actuated devices.

It has been the practice in previous machines to individually wire each one of these devices, or in some cases to use a matrix-type wiring arrangement. In a typical pinball machine such an approach can require up to eight hundred feet of wiring in seventy different colors. In addition to the cost of the wire itself the manufacturing complexity adds considerably to the cost of producing the machines. Along with the fact that it is usually necessary to separately connect and solder each wire to a particular device, the practice in the coin operated amusement game industry is to change models every few months which in turn requires a redesign of the wiring system plus the cost of teaching manufacturing personnel how to wire the new game.

SUMMARY OF THE INVENTION

It is therefore an object of the invention to provide a circuit for controlling a number of electrically actuated devices in a coin operated amusement game that includes a cable connected to a processor that in turn connects in series a number of the devices. Each device has associated with it a memory element that is connected to a clock signal line and a data line along with a power line which is connected to a power supply and each of the devices. Data is transmitted to the memory elements during a zero-crossing time portion of the power application. The memory elements in turn control the electrically actuated devices.

It is a further object of the invention to provide a cable that connects a number of electrically actuated devices in a coin operated amusement game with a processor and a power supply in series such that a memory element associated with each one of the devices responds to a clock signal on the cable to receive and retransmit a series of data signals over the cable in synchronism with the clock signals from the microprocessor. Also included in the cable is a power line which is connected to each of the devices.

Another object of the invention is to provide a system for determining the status of switches in a coin operated amusement game wherein a cable connects each of the switches in series and a memory element is associated with each of the switches. A load signal is transmitted from a processor to each memory element which causes the status of that switch to be loaded in the memory element and in response to clock signals from the processor, data is transmitted via the cable to the processor in serial form representing the status of each of the switches.

BRIEF DESCRIPTION OF THE DRAWINGS

FIG. 1 is a perspective view of a coin operated pinball apparatus;

FIG. 7 is a power supply waveform chart; and

FIG. 8 is a perspective view of a lamp assembly.

DETAILED DESCRIPTION OF THE INVENTION

Figure 2:
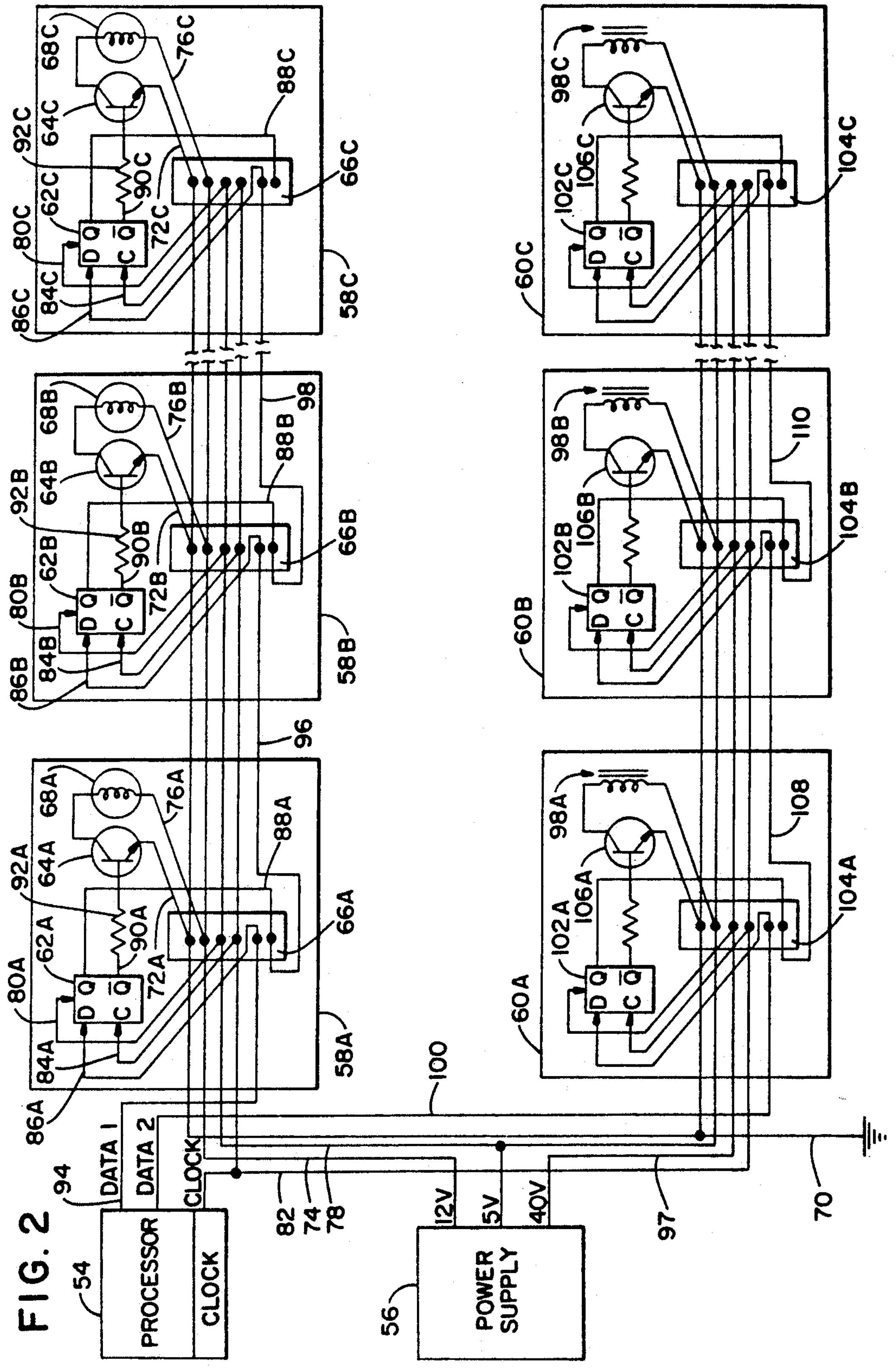
FIG. 2 is a schematic diagram of a circuit for connecting a number of electrically actuated devices to a microprocessor.

FIG. 1 provides a perspective view of a simplified portion of a typical coin actuated pinball machine 10 including a playfield 12 upon which a ball (not shown) rolls. Attached to the surface of the playfield 12 are various electrically actuated devices such as solenoid actuated kickers 14–20 and thumper bumpers 22–26. Also included are a number of lights 28–40 aligned in the plane of the playfield 12. The lights 28–40 are normally lit in a selective manner according to the scoring logic of the game 10. The playfield 12 additionally includes a number of ball activated switches that are located about the playfield 12 such as the switches indicated at 42–46. The switches shown at 42–46 are secured flush with the playfield surface 12 and can be, as is well-known in the art, pressure or electromagnetically activated. The game 10 also includes a pair of player activated flippers 48 and 50 for propelling the ball up the playfield 12. As is conventional the flippers 48 and 50 are controlled by buttons such as 52 located on the sides of the game 10.

FIG. 2 is an illustration of method of connecting lamps such as 28–40 and devices such as 14–20 and 22–26 to both a game control microprocessor 54 and a power supply 56. In the preferred embodiment of the invention, each lamp and each electrically actuated device will have associated with it an assembly board indicated by 58A–C for the lamps and by 60A–C for the electrically actuated devices. Each of the lamp assembly boards 58A–C are of generally similar construction and include a flip-flop memory element 62A–C, a switching transistor 64A–C and a mass termination connector 66A–C. Also secured to the boards 58A–C are lamps 68A–C which represent the lights or lamps 28–40 of FIG. 2.

In the embodiment of the invention shown in FIG. 2 each of the transistors 64A–C is connected to a ground wire 70 by means of a line 72A–C connected to a first terminal on the connectors 66A–C. Similarly the lamps 68A–C are connected to a 12 volt DC power line 74, from the power supply 56, by lines 76A–C connected to a second terminal of the connectors 66A–C. Power is supplied to the flip-flop 66A–C by a 5 volt power line from the power supply 56 which is connected from a third terminal of the connectors 66A–C that in turn is connected to each flip flop 66A–C by lines 80A–C. Clock signals from the processor 54 are provided to the clock inputs C of each of the flip-flops 66A–C by a clock signal line 82. Clock line 82 is attached to a fourth terminal of each connector 66A–C and lines 84A–C in turn are connected to the C terminals of each flip-flop 62A–C. A data or state input D of each flip-flop 62A–C is connected to a fifth terminal on each connector 66A–C by lines 86A–C. Each of the connectors 66A–C includes a sixth terminal which is connected by lines 88A–C to a noninverting logic output Q of each of the flip-flops 62A–C. The inverting logic output $\overline{Q}$ of each flip-flop 62A–C is applied to the base of the corresponding transistors 64A–C by lines 90A–C which includes resistors 92A–C.

The first assembly board 58A differs from the boards following it in that the fifth terminal of the connector 66A is connected to a DATA 1 line 94 that in turn is connected to the processor 54. A logic line 96 then connects the sixth terminal of connector 66A with the fifth terminal of connector 66B. In the same manner, illustrated by a line 98, each sixth terminal of connectors 66A through 66C of a series of assembly boards such as 58A–C is connected to the fifth terminal of the connector 66B through 66C of the following assembly board. For the last board 58C in a series or string of assembly boards such as 58A–C there will not be a line corresponding to line 98.

Operation of the lamp assembly boards 58A–C will now be described. The object of the arrangement shown in FIG. 2 is to light the lamps 68A–C in accordance with game play which is under control of the microprocessor 54. At specified time intervals the status of each lamp 68A–C is reset. In the preferred embodiment of the invention these intervals will correspond to the zero crossing point of the 12 volt power supply voltage on line 74. The power on line 74 can be either a full or a half Wave rectified DC voltage. The relative merits or criteria for selecting various reset intervals will be discussed in connection with FIGS. 5–7. During the reset interval the processor 56 will generate a data stream on the DATA 1 line 94 in synchronism with the CLOCK signal on line 82. For a series or string of lamp assembly boards such as 58A–C there will be one logic state generated in sequence for each board of lamp 68A–C where the first logic signal on line 94 corresponds to the last lamp 68C and the last logic signal corresponds to the first lamp 68A. For example, if there are 45 boards 58A through 58C in a string then there will be 45 logic states generated by the processor 54 on line 94. The first DATA 1 logic signal on line 94 in combination with the CLOCK signal on line 82 will result in the flip-flop 62A output Q placing on line 84A a logic signal corresponding to the first logic signal on DATA 1 line 94. At the next CLOCK signal on line 82, the corresponding second DATA 1 logic signal on line 94 will result in the Q output of flip-flop 62A being reset to correspond to the logic state on line 94 and meanwhile the previous logic signal on line 96 in combination with the CLOCK signal will cause the Q output of flip-flop 62B to reflect the logic state on that line. In this manner each of the flip-flops 62A–C outputs Q and $\overline{Q}$ will be set to the logic states reflecting the desired on-off conditions of the lamps 68A–C at the end of the number CLOCK cycles corresponding to the number of lamps 68A–C. Once the flip-flops 62A–C are set, the non-inverting output $\overline{Q}$ will be effective to control the flow of current through the lamps 68A–C by applying a switching voltage to the base of each of the transistors 64A–C. Thus the flip-flop or memory elements 62A–C will serve to maintain the lamps 68A–C in a predetermined on or off condition until the next reset interval when a new series of CLOCK signals and corresponding DATA 1 signals are generated by the processor 54.

The device assembly boards 60A–C are constructed and operate in essentially the same manner as the lamp assembly boards 58A–C. The principal differences are that a 40 volt half or full wave DC voltage is applied over a line 97 from the power supply 56 to each electrically actuated device 98A–C on the boards 60A–C and a DATA 2 signal is applied from the processor 54 over a line 100 to the data input D of each flip-flop 102A–C on the boards 60A–C. Otherwise the elements on the boards 60A–C correspond to the elements on the boards 58A–C. For example, switching transistors 106A–C correspond in function to the transistor 64A–C in that they serve to apply power to the devices 98A–C in response to the $\overline{Q}$ outputs of the flip-flops 102A–C. Also mass termination connectors 104A–C are configured with six terminals as are the connectors 66A–C with lines 78 and 82 attached to corresponding terminals. Similarly the logic output Q of the flip-flops 104A–C are transmitted for example by lines 108 and 110 to the following boards 60B through 60C.

Operation of the boards 60A–C is identical to boards 58A–C in that DATA 2 signals from processor 54 on line 100 are transmitted in synchronism with CLOCK signals on line 82 to board 60A during a reset interval. DATA 2 signals represent the desired operating condition of the devices 98A–C. In this manner operation of the devices 98A–C can be controlled by the processor 54 in accordance with a game play program. The sequence of the DATA 2 signal represent the desired operating condition of the devices 98A–C.

The FIG. 2 illustrates an arrangement whereby lamp assembly boards 58A–C are connected in series to the processor 54 and power supply 56 and the electrically actuated device assembly boards 60A–C are likewise connected in series to the processor 54 and power supply 56. However, it would be possible to connect both the lamp assembly boards 58A–C and device assembly boards 60A–C in a single series or string with the two types of boards 58A–C and 60A–C intermixed. To facilitate this arrangement the connectors 66A–C and 104A–C would have one additional terminal to accommodate both the 12 volt power line 74 or the 40 volt power line. The lamps 68A–C and the electrically actuated devices 106A–C would be connected to the appropriate terminal on the connectors 66A–C or 104A–C.

Figure 3:
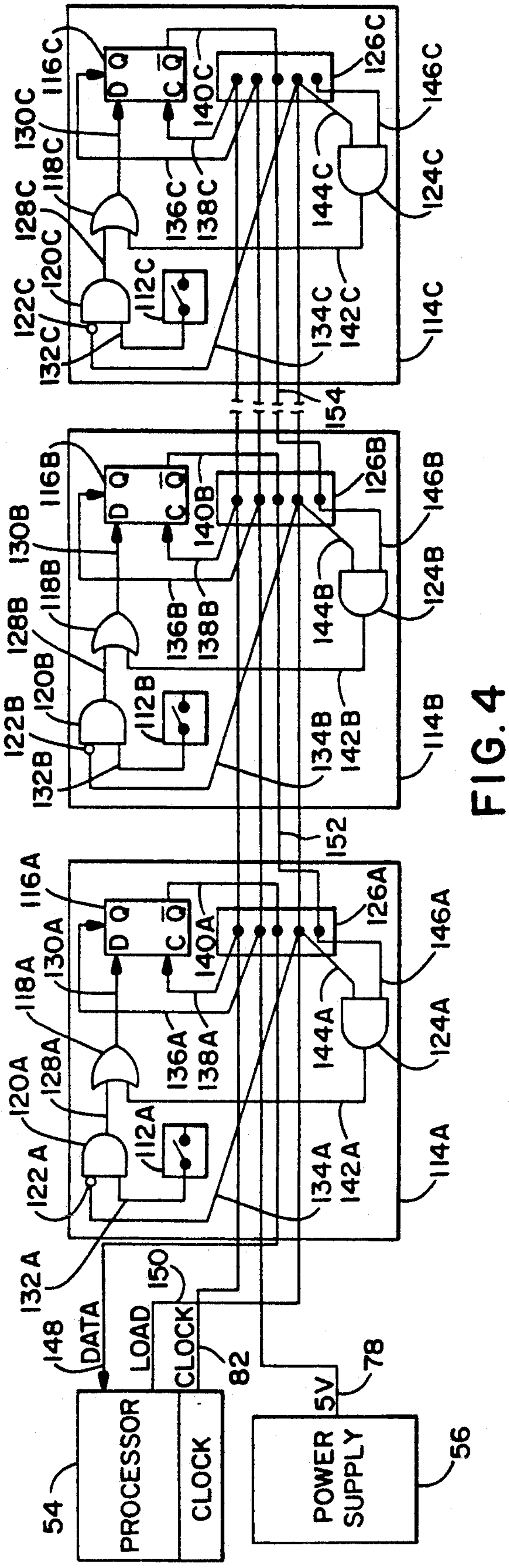
FIG. 3 is a schematic diagram of a circuit for connecting a number of switches to a microprocessor.

FIG. 3 illustrates a circuit for providing information to the processor 54 of the condition of a number of switches or ball sensing devices such as 112A–C. Associated with each switch 112A–C is a sensor board assembly 114A–C. Each sensor board includes a memory element or flip-flop 116A–C, an OR gate 118A–C, a first AND gate 120A–C configured with an inverting input terminal 122A–C, a second AND gate 124A–C, and a mass termination connector 126A–C. The output of the first AND gate 120A-C is connected to one input of the OR gate 118A-C by a line 128A-C and the output of the OR gate 118A-C is connected to the data input terminal D of the flip-flops 116A-C by a line 130A-C. Each of the switches 112A-C is connected by a line 132A-C to a noninverting terminal of the first AND gate 120A-C and the inverting inputs 122A-C are connected to the fourth terminal of the connector 126A-C by a line 134A-C. The power supply terminal of each flip-flop 116A-C is connected to the second terminal of the connector 126A-C by a line 136A-C; the clock terminal C is connected to the first terminal of the connectors 126A-C by a line 138A-C; and the inverted outputs $\overline{Q}$ are connected by lines 140A-C to the third terminal of the connectors 126A-C. Connecting the output of each of the second AND gates 124A-C to a second input of the OR gate 118A-C are lines 142A-C and the two inputs to the second AND gate 124A-C are connected to the fourth and fifth terminals of connectors 126A-C by lines 144A-C and 146A-C respectively. The processor 54 receives data from each of the connectors 114A-C via a data line 148 connected to the third terminal of connector 126A and applies a LOAD signal over a line 150 to the fourth terminal of each connector 126A-C. The CLOCK signal is transmitted over the line 82 to the first terminal of connectors 126A-C and a 5 volt voltage is supplied to the second terminal of each connector 126A-C by the line 78. In the circuit of FIG. 3, each of the connectors 126A-C has its fifth terminal connected to the third terminal of the following terminal as shown by lines 152 and 154.

Figure 4:
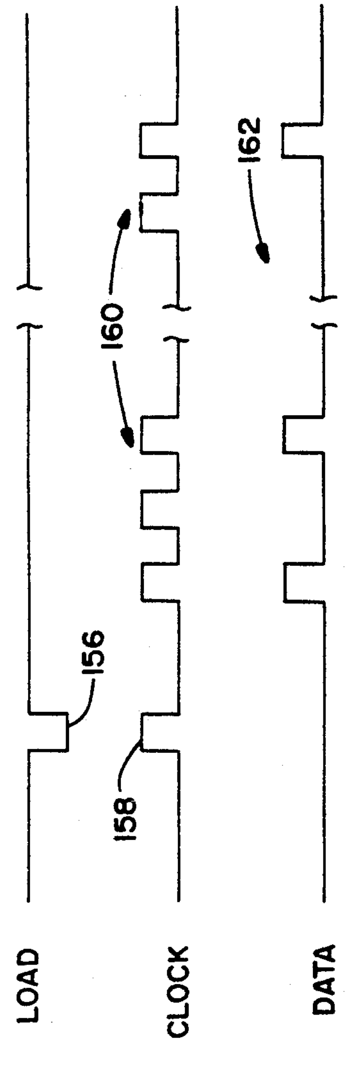
FIG. 4 is a timing diagram for the circuit of FIG. 3.

Operation of the circuit of FIG. 3 will be described in conjunction with the timing diagram of FIG. 4. The processor 54 will generate a LOAD signal on line 150 in synchronism With a first CLOCK signal on line 82 as illustrated by 156 and 158 of FIG. 4. At this point the low LOAD signal 156 applied to input terminal 122A-C which permits signals on lines 132A-C representing the status of switches 112A-C to be transmitted through AND gates 120A-C and OR gates 118A-C to the data input terminals D of flip-flops 116A-C. The simultaneous CLOCK signal 158 applied to terminal C will result in a logic output signal on terminal $\overline{Q}$ of the flip-flops 116A-C representing the status of each switch 112A-C. Then a series of CLOCK pulses are generated on line 82 by the processor 54, as shown generally at 160, such that there is one CLOCK pulse for each board 114A-C. Since the logic output $\overline{Q}$ of each flip-flop 116A-C is applied over line 146A-C to one input of each AND gate 124A-C, the LOAD signal 156 applied simultaneously to the other input of each AND gate 124A-C and the input C of each flip-flop 116A-C will result in the logic output $\overline{Q}$ of each flip-flop 116A-C reflecting the $\overline{Q}$ output of the previous flip-flop for each CLOCK pulse 160. In this manner the status of each switch 112A-C will be transmitted sequentially over DATA line 148 to the processor 54 in synchronism with the CLOCK pulses as illustrated by the DATA pulses shown at 162 of FIG. 4.

Figures 5, 6:
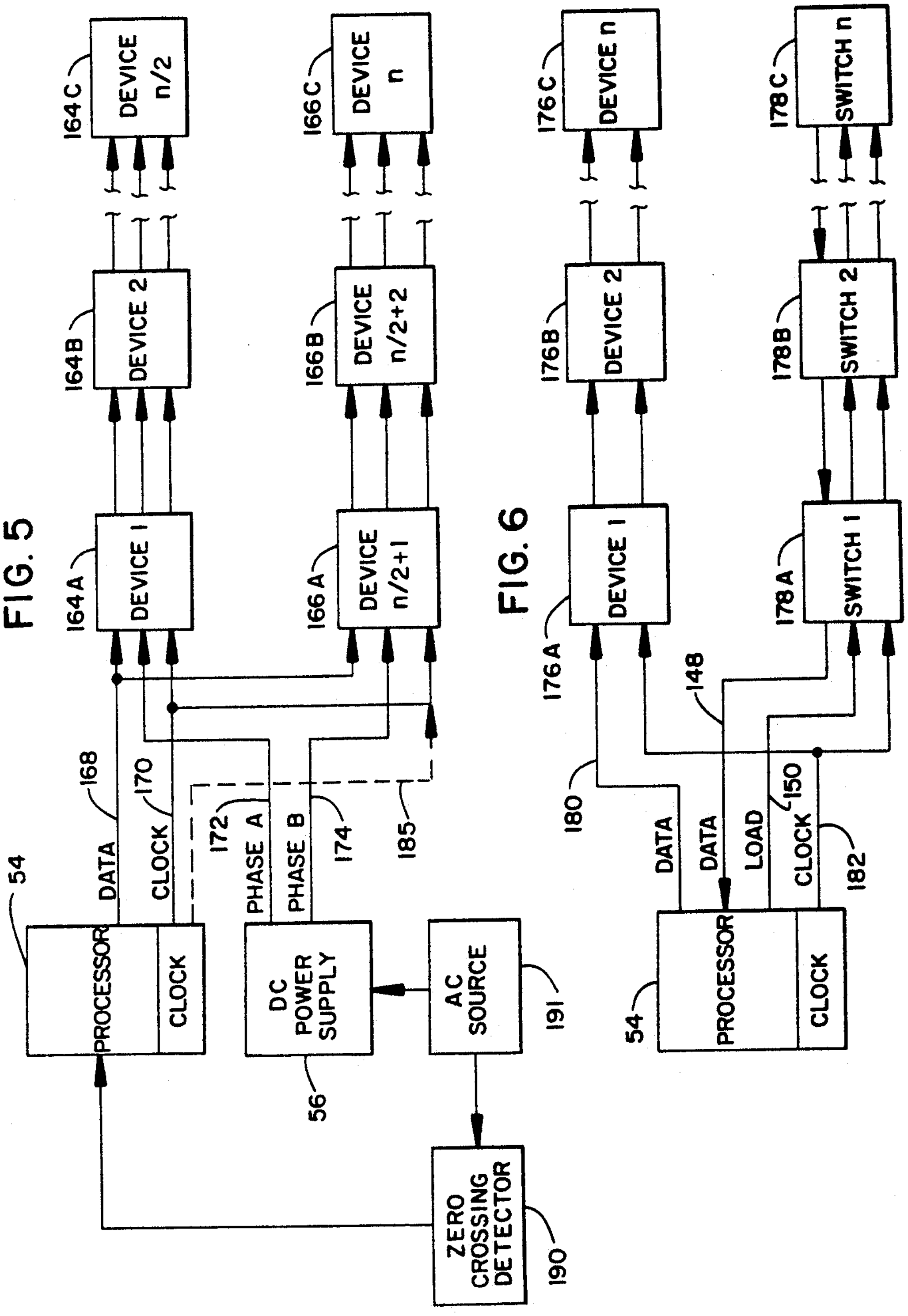
FIG. 5 is a block diagram of parallel circuits for connecting a number of electrically actuated devices to a microprocessor.
FIG. 6 is a block diagram of a circuit for connecting electrically actuated devices and switches to a microprocessor.

The block diagrams of FIGS. 5 and 6 provide an illustration of the flexibility of the invention with respect to the construction of game apparatus. In FIG. 5 for example the lamp assembly boards 58A-C and device assembly boards 60A-C of FIG. 5 are represented generally by the block denoted by reference numerals 164A-C and 166A-C. The boards 164A-C and 166A-C can be either the lamp assembly boards 58A-C or the electrically activated device boards 60A-C or mixture of the two types of assembly boards. For simplicity of description, the boards in the blocks 164A-C and 166A-C are referred to as Device 1 through Device N. In this embodiment there are two series or strings of Devices, Device 1 through Device N/2 indicated by 164A-C and Device N/2+1 through Device N indicated by 166A-C, where there are an equal number of Devices in each string. Also for simplicity, the ground line 70 and the 5 volt power supply line 78 of FIG. 2 have been omitted. In the arrangement of FIG. 5 the DATA signals and CLOCK signals are transmitted to both strings 164A-C and 166A-C via lines 168 and line 170 respectively from the microprocessor 54. However, in this embodiment the power supply 56 supplies phase A of a full wave rectified DC voltage over a line 172 to the first string 164A-C and phase B of the DC voltage over a line 174 to the second string 166A-C. The advantages of applying separate phases of the DC power supply to the two strings 164A-C and 166A-C will be described below in conjunction with FIG. 7. The operation of the circuit shown in FIG. 5 is generally similar to the operation of the circuit of FIG. 2. One of the objects of FIG.5 is to illustrate the fact that the assembly boards such as 164A-C and 166A-C can effectively be arranged in a number of different parallel string configurations. For example some games may only require a limited number of lamps or electrically actuated devices so that only a single string such as 164A-C may be necessary. On the other hand, some games may require more devices than can be readily accommodated on a single string. For instance in the case of a string of lamps such as 58A-C of FIG. 2 where the number of lamps 68A-C exceeds ninety and the clock rate of the microprocessor is 100 KHz, the duration of the time required to generate ninety plus CLOCK signals during the reset interval could result in lamp flicker. Other criteria should also be taken into account in determining the number of strings including the fact that if a component should fail in one of the assembly boards such as 164A-C or 166A-C, the whole string may become inoperative. Thus by increasing the number of assembly boards linked in parallel, operation and maintenance of the game 10 can be simplified.

As a result a number of factors should be taken into account in selecting the number of assembly boards to be connected in a string including; the number of lamps and device in the game; the cost of materials and assembly; the CLOCK signal rate; and operating and maintenance considerations.

FIG. 6 is a block diagram illustrating an embodiment of the invention combining a string of device assembly boards 176A-C and a string of switch boards 178A-C. The diagram of FIG. 6 is simplified with respect to the schematic diagrams of FIGS. 2 and 3 in that the power supply lines 74, 78, 82 and 96 along with ground line 70 are omitted. Operation of the arrangement of FIG. 6 is similar to the circuits of FIGS. 2 and 3. Device control data is transmitted from the processor 54 over a line 180 to the devices 176A-C in synchronism with CLOCK signals on a line 182. The switch boards 178A-C will respond to a LOAD signal on line 150 and CLOCK signals on line 180 to transmit data to the processor 54 representing the condition of the switches such as 112A-C associated with the boards 178.

It would also be possible to combine switch boards such as 178A-C in a string with device boards such as 164A-C. Such a combination would require additional terminals on the mass termination connectors such as 126A–C of FIG. 2 in order to accommodate the load line 150 and the return data line 148.

Illustrated in FIG. 7 is a full wave rectified D.C. voltage indicated at 184 along with corresponding half wave rectified D.C. voltages indicated at 186 and 188 for phases A and B respectively of the D.C. voltage 184. As indicated in conjunction with the discussions of FIG. 5 above, a single full wave rectified power supply D.C. voltage such as 184 can be applied to the devices 164A–C and 166A–C or alternatively two half wave rectified D.C. voltages such as 186 and 188 can be used on lines 172 and 174 of FIG. 5. An advantage of using two half wave rectified voltages 186 and 188 instead of a single full wave rectified voltage 184 is that it would permit more time to transmit the data pulses on line 168 to the devices 164A–C and 166A–C. For example, the data on line 172 would be loaded into devices 164A–C during phase B and the data on line 174 would be loaded into devices 166A–C during phase A. It should be noted that this approach may require separate sources of clock signals for the two sets of devices 164A–C and 166A–C as indicated by a dashed line 185 in FIG. 5 to avoid interfering with the operation of the devices that currently have power applied on lines 172 or 174. Since the processor 54 would have an entire half phase to load the devices with data on line 168 many more devices could be attached to a string without the previously discussed potential flicker problem. As indicated before, when using full wave rectified voltage such as 184 the data loading preferably should be accomplished in a very small time interval near the zero crossing point such as indicated at 189 of FIG. 7.

To implement the control arrangement of FIG. 5 as discussed above in connection with FIG. 7, a zero crossing detector circuit 190 is connected to an A.C. power source 191. The A.C. power source 191 provides A.C. power to the D.C. power supply 56 and the zero crossing detector 190 indicates to the microprocessor 54 the zero crossing points of the A.C. power and hence the zero crossing points such as 189 of the D.C. voltages on lines 172 and 174.

Provided in FIG. 8 is an illustration a lamp assembly indicated generally by 192 that can be used to secure an electronically actuated device such as the lamp of 68A of FIG. 2 to the underside of the playfield 12. A bracket 194 which can be used to attach the assembly 192 to the playfield 12 is secured to a lamp socket 196 and a printed circuit board 198. Again with reference to the circuit diagram of FIG. 2, the transistor 64A and the mass termination connector 66A are connected to the printed circuit board 198. Also connected to the printed circuit board is an integrated circuit 200 which contains the flip flop 62A. For simplicity, the electrical connections on the printed circuit board 198 are not shown in FIG. 8 but would in practice conform to the connections shown in FIG. 2. Thus, the arrangement of FIG. 8 provides an illustration of a preferred physical embodiment of the assembly boards 58A–C of FIG. 2 and it will be appreciated that similar structures can be used for the device assembly boards 60A–C.

The invention as discussed above has a number of very substantial advantages including the ability to connect a large number of electrically actuated devices such as lamps and solenoid actuated devices to a microprocessor in a flexible manner while using a minimum of electrical wiring. In addition, the use of assembly boards of the type shown in FIG. 8 makes it possible to further reduce costs by essentially using a single assembly with standard components to connect the devices to a microprocessor in a coin operated amusement game.

I claim:

1. A system for controlling a plurality of electrically actuated amusement game playfield features comprising:

a) a microprocessor for generating a stream of data signals without address information, each of said data signals representing control information for a unique one of said playfield features;
b) a power supply for said playfield features;
c) a plurality of discrete control circuits serially connected to said microprocessor by a data bus, one of said control circuits being physically located in proximity to each of said playfield features for selectively applying power thereto;
d) said microprocessor including means for serially transmitting said data signals to said control circuits without address information but in a specific sequence, each playfield feature being controlled only by the corresponding one of said data signals in each sequence.

2. The system of claim 1 wherein each said control circuit includes a controlled switch means for applying said power input to the corresponding playfield feature.

3. The system of claim 2 wherein said controlled switch means includes a transistor.

4. The system of claim 1 wherein each said control circuit includes latch means for storing said data signal corresponding to the associated playfield feature.

5. The system of claim 4 wherein said means for latching comprises a flip flop.

6. The system of claim 1 where said means for serially transmitting transmits said data signals such that the nth playfield feature is controlled by the N-nth data signal in said specific sequence, where N is the total number of said playfield features.

7. A system for reading the status of a plurality of switches on the playfield of an amusement game comprising:

a) a microprocessor;
b) a plurality of playfield switches;
c) a plurality of discrete control circuits serially connected to said microprocessor by a data bus, one of said control circuits being physically located in proximity to each of said playfield switches for communicating the status of its corresponding switch to said microprocessor by transmitting a data signal without address information;
d) said microprocessor including means for transmission of said data signals from said control circuits to said microprocessor without address information but in a specific sequence such that each data signal can be identified with its corresponding switch.

* * * * *